J. A. BUTCHER.
VEHICLE STEP.
APPLICATION FILED MAY 12, 1914.

1,149,338.

Patented Aug. 10, 1915.

WITNESSES:
C. H. Ellis
R. E. Bruckner.

INVENTOR
J. A. Butcher.
BY Jack H. Athley
ATTORNEY

UNITED STATES PATENT OFFICE.

JOSEPH A. BUTCHER, OF DALLAS, TEXAS.

VEHICLE-STEP.

1,149,338.  Specification of Letters Patent.  Patented Aug. 10, 1915.

Application filed May 12, 1914. Serial No. 838,011.

*To all whom it may concern:*

Be it known that I, JOSEPH A. BUTCHER, a citizen of the United States, residing at Dallas, in the county of Dallas and State of Texas, have invented certain new and useful Improvements in Vehicle-Steps, of which the following is a specification.

This invention relates to new and useful improvements in vehicle steps.

The object of the invention is to provide a step arranged to be fastened to the hub nut of a vehicle axle and so shaped as to project inward over the hub of a wheel and prevent persons stepping on or "riding" the hub.

Another object is to provide a step having a nut engaging member, so constructed that the step may be disposed in an upright position irrespective of the position of the nut, and also to provide means for fastening the step on the nut.

A still further object of the invention is to provide a device of the character described that will be strong, durable, efficient and simple and comparatively inexpensive to construct, also one in which the several parts will not be likely to get out of working order.

With the above and other objects in view, the invention has relation to certain novel features of construction and operation, an example of which is described in the following specification and illustrated in the accompanying drawings, wherein:—

Figure 1:
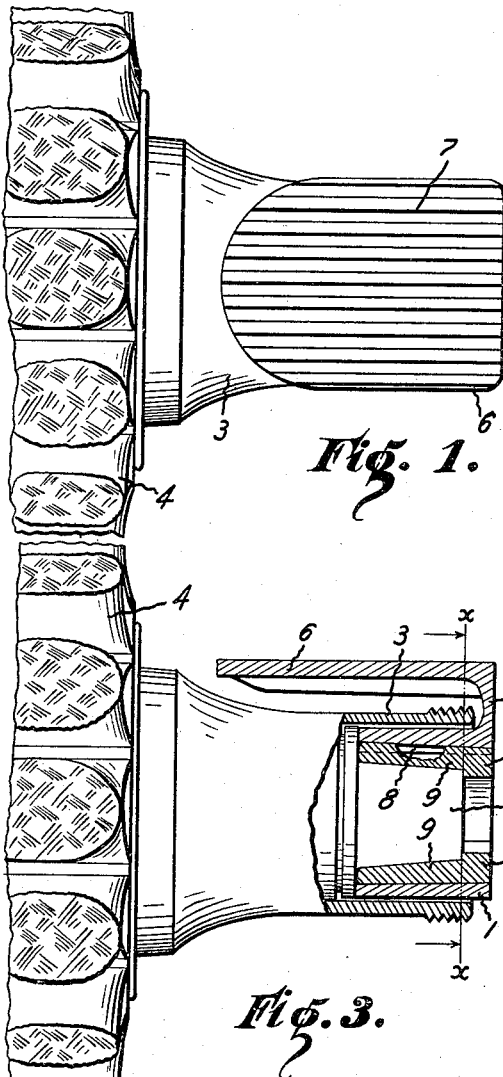
Figure 2:
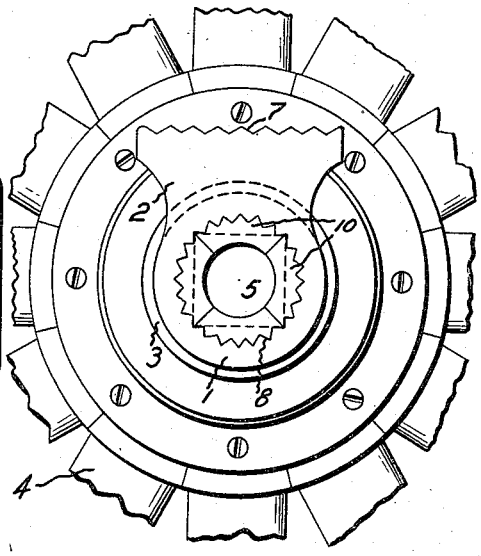
Figure 3:
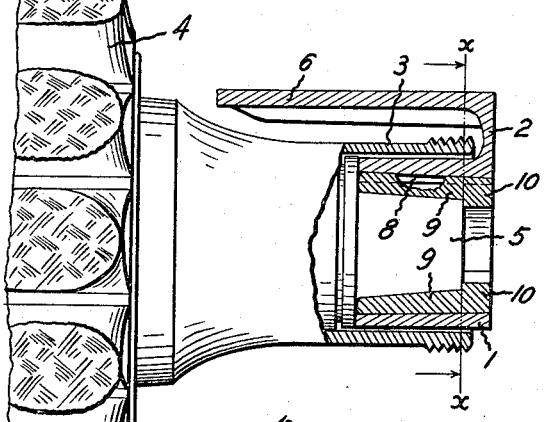
Figure 4:
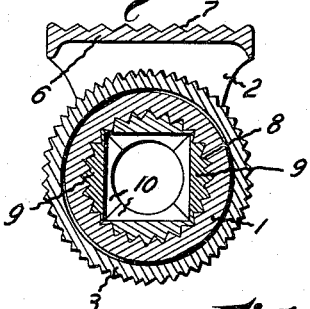
Figure 5:
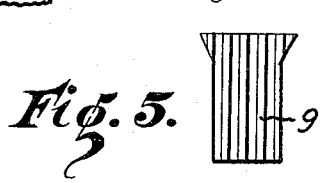
Figure 6:

Figure 1: is a plan view showing the step applied to a wheel. Fig. 2: is a front elevation of the same. Fig. 3: is detail of the step in section and showing the manner of fastening the step on the nut. Fig. 4: is a transverse sectional view on the line X—X of Fig. 3. Fig. 5: is a face view of one of the locking keys, and Fig. 6: is an underside view of the same.

In the drawings the numeral 1, designates a sleeve or nut engaging member, which has a shape suitable for surrounding a nut within the outer end of a hub. This sleeve extends laterally from one side of a shank 2, and is preferably formed integral therewith and at one end thereof. The sleeve 1, may have its surface tapered toward its free end so as to freely enter the outer end of the hub.

In Fig. 2, the sleeve 1, is shown in detail inserted in the hub 3, of a wheel 4. The sleeve surrounds the nut 5, of the axle and has its free end impinging the flange of said nut. It will be noted that the shank 2, stands in a vertical position in close proximity to the outer end of the hub 3.

At the upper end of the shank or that end opposite to the sleeve 1, a laterally extending tread plate 6 is provided. This tread plate is preferably formed integral with the shank and overhangs the sleeve 1. When the step is placed on a hub the plate will extend inward thereover as shown best in Fig. 3. The shank 2, is of such length as to support the plate 6, in close proximity to the surface of the hub and yet allowing sufficient clearance therebetween to permit the wheel to turn freely. The upper surface of the plate 6, should be roughened and I prefer to provide it with a plurality of parallel ribs 7, extending longitudinally thereof. The plate is given a shape conducive to strength and a neat appearance.

The sleeve 1, is formed with a concentric bore, or opening extending therethrough. This bore is flared slightly from the shank so as to more readily fit the nut 5, which is tapered outward. The inner surface of the bore of the sleeve is longitudinally toothed or recessed by means of ribs 8, extending the length thereof, as shown in Figs. 3 and 4. Hub nuts are as a rule, square in cross section. By providing the ribs 8, a plurality of longitudinal recesses, angular in cross section, are formed in the sleeve. In placing the step on the nut 5, the latter is received in said recesses and by reason of their frequence, may be positioned with its tread plate 6, level irrespective of the angle of the nut. In this way the step is locked on the nut so far as relative rotation is concerned.

One of the important features of the invention resides in the means for locking the sleeve on the nut against outward displacement. When the sleeve is on the nut 5, four approximately quarter round cross sectional slots or recesses are left in the bore of the sleeve. These recesses taper inwardly and I provide a taper key 9 for each recess or slot. One of these keys is shown in the detail in Figs. 5 and 6. Each key has a flat underside to contact with one of the sides of the nut 5, and acts as a wedge. The opposite or rounded side is ribbed to correspond with the bore of the sleeve and will fit therein. Each key 9, has a head 10, which overhangs the flat side, and impinges the end of the nut 5, when the key is driven into the sleeve. Each head is cut on the arc of a circle as shown in Fig. 2, so that in cases where the axle extends through the nut, the key will not interfere with the same.

A step of this character has many advantages. Delivery boys invariably stand on the hub of the wagon wheel and use it as a step. This step will prevent this practice and it will also place a step in a convenient position for all who enter the wagon. Being securely fastened and not depending upon set screws and the like, it is not likely to become loose.

The tread must be close to hub because if it is too high, there is danger of one's foot slipping into the spokes.

What I claim is:

1. As a new article of manufacture, a vehicle step comprising a shank, a sleeve integral with the shank and extending laterally therefrom, a tread plate integral with the shank and extending laterally therefrom and overhanging the sleeve, said sleeve having a bore provided with a plurality of longitudinal circumferential recesses disposed to receive the corners of a hub nut and whereby said sleeve may adjust on the nut to dispose the tread plate horizontally, said recesses being greater in number than the corners of the nut, and means for locking the sleeve on the nut.

2. In a vehicle step, the combination of a shank, a sleeve extending laterally from one end of the shank, a tread plate extending laterally from the opposite end of the shank and overhanging the sleeve, said sleeve having a bore provided with a plurality of longitudinal circumferential recesses disposed to receive the corners of a hub nut, and a plurality of wedge shaped keys each having one side flat and the other ribbed longitudinally and curved transversely, said keys fitting in the bore of the sleeve so that the ribbed and curved sides will engage in the recesses and the flat sides will engage the nut.

3. The combination in a vehicle hub step having an axle nut with a plurality of flat sides, of a shank, a substantially flat tread plate extending laterally from one end of the shank, a sleeve extending laterally from the other end of the shank, said sleeve having a plurality of recesses constructed to receive the corners of an axle nut and said recesses being frequent and close together whereby the sleeve may be subjected to comparatively fine circumferential adjustment, the number of said recesses being greater than the sides of said nut, and the tread plate thus disposed horizontally irrespective of the position of the axle nut, and means for locking the sleeve on an axle nut.

4. The combination in a vehicle hub step having an axle nut with a plurality of flat sides, of a shank, a substantially flat tread plate extending laterally from one end of the shank, a sleeve extending laterally from the other end of the shank, said sleeve having a plurality of recesses constructed to receive the corners of an axle nut and said recesses being frequent and close together whereby the sleeve may be subjected to comparatively fine circumferential adjustment, the number of said recesses being greater than the sides of said nut, and the tread plate thus disposed horizontally irrespective of the position of the axle nut, and locking wedges disposed between the faces of the nut and the interior of the sleeve.

In testimony whereof I affix my signature in presence of two witnesses.

JOSEPH A. BUTCHER.

Witnesses:
R. E. C. BRUCKNER,
JACK A. SCHLEY.

Copies of this patent may be obtained for five cents each, by addressing the "Commissioner of Patents, Washington, D. C."